3,019,112
FRUIT SAUCE PROCESS
William Abner Rooker, Berryville, Va.
(112 E. Piccadilly St., Winchester, Va.)
No Drawing. Filed Nov. 25, 1959, Ser. No. 855,272
2 Claims. (Cl. 99—154)

This invention relates to an improved process for the manufacture of fruit sauces and to the improved products obtained thereby. In particular, it relates to an improved process for making apple sauce, and to an improved apple sauce product.

With present methods of preparing apple sauce; the fruit is peeled, cored, trimmed, chopped, and then conveyed to a cooker in which the prepared fruit and the requisite quantity of sugar are cooked to the desired degree. The volume of fruit is so large that, for economical and efficient operations, the cooking must be accomplished in a very short time. With present processes the cooking period seldom exceeds four minutes. To achieve thorough cooking in such a short period, the apples are cooked under pressure at temperatures of about 216 to 226 degrees Fahrenheit. The requisite cooking temperatures and pressures are generally obtained by the injection of steam into a closed cooking chamber.

Although the cookers may be batch type, to effect efficiencies in processing and economies in labor, the sauce cookers are preferably of a continuous type in which the cooked sauce is discharged from the cooker at the same rate that the raw fruit and sugar enter the cooker. The movement of the fruit and sugar thru the body of the cooker is controlled by a worm or a system of flights or by other suitable mechanical means within the cooker. The raw fruit and sugar enter the cooker thru inclosed worms or butterfly valves which, when full, serve as seals that prevent loss of steam pressures in the cooker. The cooked sauce leaves the cooker thru similar worms or butterfly valves.

After cooking is completed, the cooked mass is conveyed from the cooker to a finishing machine in which the coarse fibers, seeds, and peel particles are removed. When the cooked sauce leaves the cooker and enters the finisher there is a sudden drop from the super-atmospheric pressures maintained in the cooker to the normal pressure prevailing in the finisher, which is usually atmospheric pressure. The drop in pressure is accompanied by a drop in temperature which is effected by the evaporation or the flash-off of vapor. At the same time a large proportion of the aromatic or bouquet and flavor imparting constituents of the apple which are highly volatile are carried away in the vapor flash-off when the sauce leaves the cooker and enters the finisher with consequent impairment of the flavor and aroma of the apple sauce product.

In an earlier application issued as Patent 2,582,396 I have described one means for preparing fruit sauces whereby losses of aromatic constituents of the fruit is substantially eliminated with resulting improvement in aroma and flavor of the finished product. The method described therein comprised forming a blend of hot cooked sterile sauce with a pulp of raw fruit.

One object of this invention is to provide a simpler process for preparing fruit sauces wherein the aromatic constituents of the fruit are retained and an improved product is obtained, wherein all of the fruit processed is cooked so as to retain the aroma and hence blending of cooked fruit and raw fruit is not necessary.

Another object of the invention is to minimize losses of aromatic and flavor producing volatiles from the fruit while retaining a simplicity of operation and an efficiency and economy equal to that of presently known processes.

Still another object is to effect the filling of sauce containers at lower temperatures than those of presently prevailing practices, whereby the color and texture of the finished product are improved.

These and other objects will become apparent from the following description of a preferred mode of practicing my invention.

I have discovered that the aromatic losses experienced in prior procedures commonly employed can be minimized or substantially completely avoided by cooling the sauce before it leaves the cooking unit to a temperature below its normal boiling point at the pressure to which it is subjected when it leaves the cooking unit enroute to the finishing unit but above the sterilization temperature of the fruit. Normally this involves cooling it to a temperature below its boiling point (at atmospheric pressure), but not below about 180° F., whereby the fruit is not cooled below its sterilization temperature.

I have also discovered that a practical and efficient means of cooling the cooked sauce is to pass it thru a closed worm conveyor attached to the body of the cooker and provided with a cooling means, such as a double jacket through which cold water is circulated as the cooling medium. The sterile sauce leaves this cooling section of the cooker at a temperature below its normal boiling point at atmospheric pressure, and the undesirable flash-off of the fruit aromatics is prevented.

In general my process comprises: preparing the fruit in the usual manner, charging the prepared fruit into a cooker with sufficient sugar for the desired degree of sweetening; cooking the fruit under pressure and at temperatures above 212° F.; cooling the cooked product to below the normal boiling point of the product before appreciably diminishing the pressure on the cooked product; finishing the sauce by removal of any extraneous or undesired material; and finally filling containers with the sauce.

More specifically my process is applied to the commercial preparation of apple sauce in the following manner: The fruit is peeled, cored, trimmed and cut in the usual manner. The prepared fruit and the required amount of sugar are preferably charged into a continuous cooker and cooked under pressure at between 216° F. and 226° F. The cooked sauce is cooled to between 180° F. and 212° F. and preferably to between about 185° F. and 190° F. prior to discharge from the cooker. The cooked sauce, cooled to the extent indicated, is finished in a standard finishing machine, whereby peel particles, coarse fibers, undercooked lumps, and any other unwanted material is removed. The sauce leaving the finisher is, it will be noted, sterile and at a temperature above the sterilization temperature for the fruit being processed.

After the sauce is passed thru the finisher it is filled into cans or jars and the containers are sealed immediately. The containers are then inverted or turned up-side down to sterilize the lids. The hot sauce serves as the sterilizing medium. Then the containers are cooled quickly in water. If over-cooked in the containers, the sauce acquires an off flavor, an objectionable brownish color, and an undesirable pasty texture.

In present-day normal practice the sauce comes from the finisher at 209° to 210° F. and is filled into the containers at 204° to 208° F. I have discovered, however, that the canned fruit sauce will remain sterile if filled at 180° F. and that at such a reduced filling temperature the texture and color of the sauce are much superior to the color and texture of sauce filled at the usual 204° to 208° F.

To carry out my invention with present equipment it is necessary to equip the cooker with a suitable cooling means. In a batch process the cooking kettle is preferably a double wall vessel with means to admit either a heating fluid or a cooling fluid to the space enclosed between the walls. In a continuous type cooler, the cooling means is preferably a double-jacketed discharge worm. The length and diameter of the cooling section are such as to prevent steam-pressure losses in the body of the cooker and to allow sufficient cooling surface to enable the sauce to be cooled to the desired temperature. The precise dimensions of the cooling section may be readily determined for the specific cooking temperatures employed; the quantity and temperature of the cooling water; and the amount of sauce to be processed in a unit of time.

The following specific example further illustrates a preferred practice of my invention.

(1) The fruit is prepared in the usual manner by peeling, coring, trimming, etc.

(2) The prepared fruit is cooked in a continuous cooker under pressure and at temperatures of 216° F. to 226° F.

(3) The cooked sauce is discharged from the body of the cooker thru a cooling section which is preferably an attached double-jacketed worm conveyor forming an extension of the discharge end of the cooker. Cold water is circulated thru the jacket in sufficient volumes to reduce the temperature of the cooked sauce to below 212.5° F. (its normal boiling point at atmospheric pressure) but not below 180° F. and in actual practice I prefer to reduce the temperature of the cooked sauce to between 185° and 190° F. before it leaves the cooling section of cooking unit and enters the finisher.

(4) After removal of peel, coarse fibers, seeds, etc. in the finisher, the finished sauce is then filled into containers which are then sealed, inverted, and cooled in the usual manner.

By the procedure described above I retain a major portion of the aromatic constituents of the fruit which are lost with most present processes of sauce manufacture. And, by filling the containers at lower temperatures than those employed in other presently practiced processes known to me, I obtain substantial improvements in the color and the texture of the finished product.

Although my new process has been particularly described with respect to the preparation of apple sauce, it is equally suitable for the preparation of sauces from other fruits, as for example, for consumption by young children. In general, any fruit which is suitable for the preparation of a sauce and which has a pH of less than 4 may be processed according to my method. Examples of other fruits which can be made into sauces by my process, include apricots, peaches, pears, pineapples, plums, quince and the like. The cooking temperatures will, of course, vary with the individual fruit and care must be taken not to reduce the temperature of the batch below the requisite sterilization temperature for the particular fruit. In practice, it is advisable not to reduce the temperature of the sauce quite to the minimum sterilization temperature to make certain that cooling below the effective temperature does not occur during the short interval requisite for canning the finished sauce. The finished sauce should be immediately poured into containers and sealed. After filling, sealing and inverting the containers, the containers are cooled, labeled and packed in the usual manner.

My process is also applicable to mixtures of different kinds of fruit, as for example, sauces comprising blends of apples and apricots, pears and apples, and the like, or to mixtures of a single fruit, e.g. mixtures of several varieties of apples.

Although this invention has been described with reference to illustrative embodiments thereof, it will be apparent to those skilled in the art that the principles of this invention may be embodied in other forms, but within the scope of the appended claims.

Having now described my invention in accordance with the patent statutes, I claim:

1. A process for preparing fruit sauces from fruit having a pH less than 4 which comprises: cooking the fruit under pressure to form a hot, cooked, sterile sauce; cooling under pressure the hot, cooked, sterile sauce to a temperature substantially above the minimum sterilization temperature for said fruit but below its normal boiling point at atmospheric pressure, thereby eliminating any substantial loss by volatilization of the aromatic constitutents present in the cooked product; and thereafter finishing the cooled, cooked sauce before it has cooled to a temperature below the minimum sterilization temperature for said fruit.

2. A process for preparing fruit sauces from fruit having a pH less than 4 which comprises: cooking the fruit under pressure to form a hot, cooked, sterile sauce; cooling under pressure the hot, cooked, sterile sauce between 185° and 190° F. thereby eliminating any substantial loss by volatilization of the aromatic constituents present in the cooked product, and thereafter finishing the cooled, cooked sauce before it is cooled to a temperature below the minimum sterilization temperature for said fruit.

References Cited in the file of this patent

UNITED STATES PATENTS

| | | |
|---|---|---|
| 1,377,681 | Hayda | May 10, 1921 |
| 2,582,396 | Rooker | Jan. 15, 1952 |